United States Patent Office 2,815,268
Patented Dec. 3, 1957

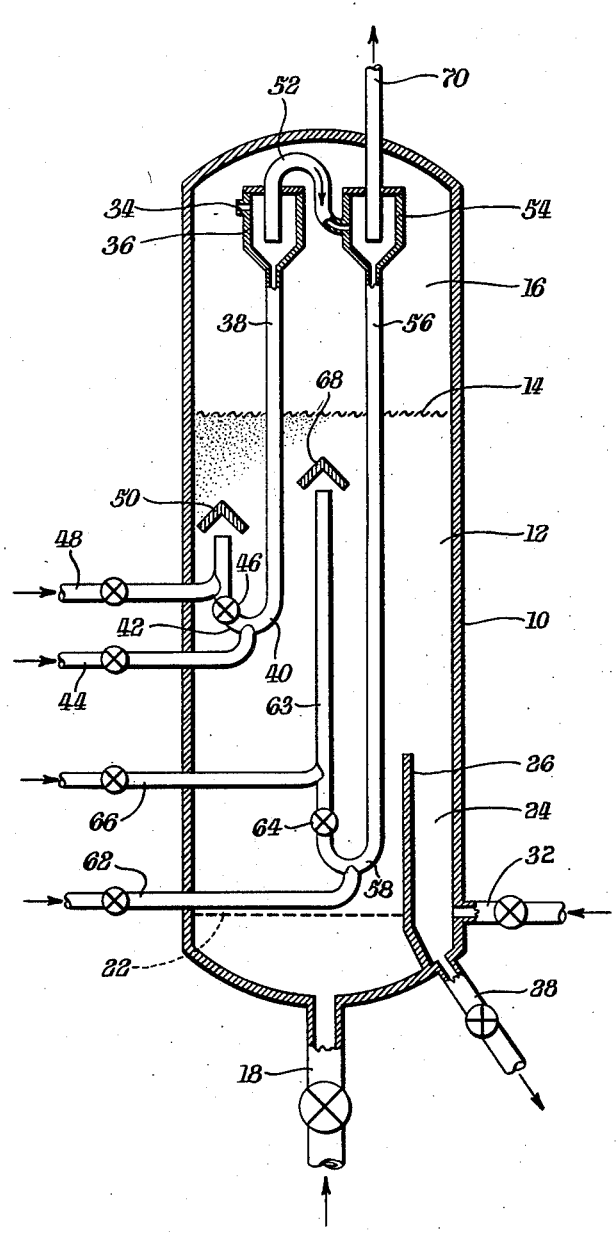
INVENTOR
Arnold F. Kaulakis
BY
ATTORNEY

2,815,268

APPARATUS FOR TREATING AND SEPARATING FINELY DIVIDED SOLIDS

Arnold F. Kaulakis, Chatham, N. J., assignor to Esso Research and Engineering Company, a corporation of Delaware Application August 5, 1953, Serial No. 372,450

1 Claim. (Cl. 23—288)

This invention relates to the recovery of finely divided solids from gases or vapors and more particularly relates to insuring proper operation of cyclone separators or the like.

In fluid solids systems such as fluid catalytic cracking units, the cyclone separators or other dust-gas separators are usually arranged in the upper portion of the reactor and regenerator. The vapors or gases leaving the dense fluidized bed of catalyst contain entrained solids which are separated in the cyclone separators or the like and returned to the dense fluidized bed through a dipleg. It is important that the dipleg be maintained full of solids to prevent backflow of gases or vapors up the dipleg. In starting up a unit, it is necessary to prevent loss of catalyst by upflow of gas and catalyst through the dipleg and to overcome this difficulty mechanical devices such as dampers, flapper valves, etc., have been used to seal cyclone separator diplegs but they have not been entirely satisfactory.

In temporary upsets, the same condition may occur and it is difficult to form a dipleg seal once it is lost. Failure to obtain a seal causes high solids losses, since the cyclone separators are in essence by-passed when gas flows up the diplegs. In using dampers to establish and maintain a seal, it is difficult to know whether a seal has been established, or when a seal has been lost once established.

The separation of solids by cyclone separators in series is selective as to size, that is, the coarsest particles are removed in the first stage of cyclone separators, finer particles in the second stage of separators and fines or extremely fine material in the tertiary stage of separators. The finer particles collected in the dipleg from the secondary and tertiary stages of separators are harder to fluidize and the density of the solids in the diplegs is less than in the fluidized bed itself in the vessel. Hence, more length of diplegs from the secondary and tertiary separation stages is required to build up the same pressure that is built up by a shorter dipleg of coarser particles.

Greater flexibility can be obtained in a given installation with the present invention. In previously or conventionally designed diplegs, the discharge end of the diplegs must be relatively near the level of the dense bed. This is so because the density of the solids mixture is lower than in the dense fluidized bed itself and thus the pressure build-up per foot of height is lower in the dipleg than in the dense bed. In other words if the dipleg extends down too far into the bed, the pressure differentials are such that the solids will flow from the dense bed upwards into the dipleg and if this happens the cyclone separators do not remove entrained solids from the effluent gasiform material.

According to the present invention a positive seal is always maintained for the diplegs from cyclone separators by providing a U-bend at the base of the dipleg and extending the riser of the U-bend to an upper portion of the dense fluidized bed or into the dilute phase in the vessel. Some gas is introduced into the discharge end or riser of the U-bend to provide positive flow so that even when no solids are being returned down the dipleg, the U-bend will remain free of solids and will effectively seal the dipleg or cyclone outlet from the dense bed.

The amount of gas introduced into the discharge end or riser of the U-bend can be controlled to give a very low density of the solids in the riser so that positive flow of solids into the dense fluidized bed is maintained with no danger of reversal. This latter feature is important since commercial plants such as catalytic cracking plants must operate with widely varying levels of catalyst or solids in the reactor and/or regenerator. It is important to maintain positive flow of solids into the fluidized dense bed of solids particularly in plants with two or more stages of cyclone separators because as above set forth the pressure build-up in the column of solids in the dipleg from the secondary and tertiary cyclone separator stages is very low due to the small particle size of the solids collected in these stages. The outlet of the risers of the U-bends may be above or below the normal level of solids in the vessel and return of solids to the vessel from the cyclone separators is assured.

In the drawing the figure represents one form of apparatus adapted for carrying out the invention.

Referring now to the drawing, the reference character 10 designates an elongated cylindrical vessel which may be a reactor, a regenerator or a contacting vessel in general where finely divided solids are maintained as a dense turbulent fluidized bed 12 having a level generally indicated at 14 with a dilute phase 16 thereabove. The gasiform material and finely divided solids are passed through line 18 into the bottom portion of vessel 10 below distributing grid 22. In catalytic cracking of hydrocarbons, a relatively heavy oil such as gas oil and cracking catalyst such as silica-alumina catalyst are passed through line 18 and the catalyst bed 12 in reactor 10 is maintained at a cracking temperature within the range of about 850° to 1000° F. to produce motor fuel such as gasoline and other desirable products. During regeneration with air the temperature in the regenerator is between about 900° and 1200° F.

The cracking catalyst or other solid is of a size between about 200 and 400 standard mesh or finer and preferably includes particles of different sizes ranging between about 0 and 150 microns with the major portion of the particles being between about 20 and 80 microns.

The superficial velocity of the vapors and gases passing upwardly through fluid bed 12 is between about 0.5 and 3.0 feet per second and when using a silica alumina cracking catalyst, the density of the dense fluid bed 12 will be between about 35 and 15 lbs. per cu. ft. In a hydroforming operation the pressure in vessel 10 is between about 100 and 300 lbs. p. s. i. g. and using an alumina-molybdenum oxide catalyst of the same particle size as above described for catalytic cracking and using a superficial velocity between about 0.1 and 1.5 ft./sec., the density of the fluid bed 12 will be between about 25 and 45 lbs./cu. ft. In hydroforming the temperature is between about 850° and 950° F. and during regeneration with air the temperature in the regeneration zone is between about 900° and 1200° F.

When using vessel 10 as a regenerator air and catalyst are introduced into the bottom of vessel 10 below grid 22 through line 18. Instead of introducing gasiform material and finely divided solids together through line 18, the gasiform material is introduced via line 18 and the solids introduced into the fluid bed 12 through a separate line (not shown).

Spent or regenerated catalyst or solids are withdrawn from the dense bed 12 into a reservoir 24 formed by a vertical baffle 26 spaced from the inner wall of vessel at the bottom thereof or into a vertical pipe extending into the dense bed. Solids are withdrawn from reservoir 24 through line 28 which may be a standpipe for building up pressure for conducting the solids to the other vessel. Circulation of solids between vessels in fluid solids systems is well known and need not be described in further detail. Stripping gas such as steam may be introduced into the bottom portion of reservoir 24 through line 32 in a known manner.

The finely divided solids passing upwardly through the vessel 10 form dense turbulent fluid bed 12 and the gasiform material passing up through the dilute phase 16 contain entrained particles which are substantially removed by passing the gasiform material through two or more stages of cyclone separators or other dust separating means. Each of the stages may comprise more than one cyclone separator provided with diplegs which converge into a larger common dipleg for each stage.

The gasiform material or vaporous reaction products containing entrained solids pass through inlet 34 of primary cyclone separation stage 36 for removal of a major portion of the entrained solids.

The separated solids pass through dipleg 38 which is provided at its lower end with a U-bend or 180° bend 40 and a riser portion 42. Dipleg 38 is shown as extending to about the middle of vessel 10 but it could be extended to near grid 22, if desired. Aerating or fluidizing gas such as steam is introduced into the bottom portion of the U-bend through line 44. The riser portion 42 is provided with a fixed restriction 46 which may be a valve. The fixed restriction is necessary to give stable control of catalyst flow. Control is obtained by gas which is introduced into riser 42 above valve or restriction 46 through line 48. This gas is used for controlling the rate of flow or for reducing the density of the solid mixture in the riser portion 42 to insure flow of the catalyst particles into the dense bed 12. Arranged above the outlet end of the riser portion 42 there is shown a baffle 50 which is shown as an inverted V in cross section but other forms of baffles may be used. The baffle is not essential and may be omitted. This baffle when used is provided to reverse the direction of flow of the gas leaving the riser portion 42 and passing into the dense bed 12.

As shown in the drawing the cyclone separator 36 is the primary stage of separation and less difficulty is experienced with returning the separated solids through the dense bed 12 from the primary cyclone separation stage than from the other stages because the particles are coarser and form a denser fluidized column.

The gasiform material from which solids were separated in separation stage 36 pass through line 52 to a second cyclone separation stage 54 which may comprise more than one cyclone separator for separating additional solids from the gasiform material. The separated solids are passed to dipleg 56 extended downwardly from the second cyclone separator 54. The dipleg 56 is shown as longer than the dipleg 38 on the primary cyclone separator and extends to near the bottom portion of vessel 10 and near and above grid 22. The lower end of the dipleg is formed into a U-bend 58 or a 180° bend similar to that described in connection with dipleg 38. Fluidized or aerating gas is introduced into the bottom of the U-bend 58 through line 62. The entire dipleg of this invention also includes a riser or upflow leg 63 which extends up from the U-bend portion 58. The riser is provided with a valve or restriction 64. Gas for introduction into the riser is passed through line 66 above valve or restriction 64 and in this way flow of the solids is insured upward through the riser 63 for return to the dense fluid bed 12. Arranged above the outlet end of the riser 63 is a baffle 68 similar to baffle 50 above described. Baffle 68 may be omitted.

The separated gasiform material is removed overhead from separator 54 through line 70. Where the reaction vessel 10 is a cracking zone the vaporous reaction products are taken overhead through line 70 and further treated as desired to recover valuable products. Where the vessel 10 is a regeneration zone the combustion gases are taken overhead through line 70.

In the drawing there are shown only two separation stages but it is to be understood that a tertiary cyclone separation stage may be used if desired. Each separation stage will preferably include more than one cyclone separator.

The powdered material recovered in the secondary stage of cyclone separator is finer than that recovered in the primary stage. The powdered material recovered in the tertiary stage of cyclone separators is extremely fine and harder to fluidize than the coarser particles.

In addition there is a pressure drop and loss of pressure as the gasiform material passes from the dilute phase 16 through the first and second cyclone separation stages. This means that a longer column of fluidized solids is necessary in dipleg 56 than in primary dipleg 38 to build up sufficient hydrostatic pressure to return the separated solids to the dense fluid bed 12 because there is a lower pressure at the top of the column in dipleg 56 than there is in the top of the column in primary dipleg 38.

Because of the finer material collected in dipleg 56 and because of the lower pressure at the top of the column of solids in dipleg 56 a longer fluidized column is necessary to build up pressure for returning solids to the dense bed 12. To get this additional height of column would necessitate building a taller vessel 10 to mount the cyclone separators at a higher lever while maintaining a bigger or deeper dilute phase 16 than is shown in the drawing. That is, for the same quantity of catalyst or solids holdup in vessel 10 it would be necessary to build a taller vessel to provide more height in the dilute phase for the dipleg 56.

With the present invention it is not necessary to provide extra vessel length and actually smaller or shorter vessels can be used. The separated solids in the dipleg 56 form a relatively dense fluidized column and utilizing the U-bend and riser, additional gas is introduced into the riser to reduce the density of the mixture and the pressure produced by the column in the dipleg 56 is sufficient to return the solids to the dense fluidized bed 12 via the riser 63. While the outlets of risers 42 and 63 are shown as below the level 14 of dense bed 12, they may be located above level 14 to discharge into the dilute phase 16.

As a specific example and utilizing silica alumina catalyst in a cracking operation the particles separated in the secondary cyclone 54 and passed to dipleg 56 will have a particle size of about 20 microns. The density of the fluidized mixture in dipleg 56 will be about 10 lbs. per cu. ft. With a dipleg of about 30 feet long and a pressure of 10 p. s. i. g. in the cyclone, the pressure at the bottom of the dipleg will be about 12 lbs. per square inch gage. Sufficient gas such as steam is introduced into riser 63 from line 66 above value or orifice 64 to reduce the density of the mixture to about 7 lbs. per cubic foot. With a 10 ft. long riser, the pressure buildup by the column of solids in dipleg 56 will then be enough to return the less dense mixture in riser 63 to the dense fluidized bed 12 in vessel 10.

The present invention can be used with various processes such as catalytic cracking, thermal cracking or coking in the presence of finely divided solids adsorption, hydroforming, etc.

What is claimed is:

An apparatus of the character described including in combination, a cylindrical vessel, means for introducing finely divided solids to said vessel, means for introducing gasiform material into the lower portion of said vessel at such a rate to maintain a dense fluidized bed of solids in said vessel with a dilute phase thereabove, a plurality of cyclone separators in series in the upper portion of said vessel above the normal level of the dense fluidized bed for separating entrained solids from gasiform material leaving the dilute phase in said vessel, means for removing gasiform material from the upper portion of said vessel, means for separately removing solids from the lower portion of said vessel, at least the second of said cyclone separators being provided with a U-bend solids return means arranged inside said vessel, said U-bend solids return means including a dipleg extending down from said cyclone separator to near the bottom portion of said vessel and a U-bend bottom portion having a riser extending upwardly therefrom to near the upper portion of said vessel, a restriction in the lower portion of said riser, means for introducing aerating gas into said U-bend bottom portion below said restriction, means for introducing gas into the lower portion of said riser above said restriction for reducing the density of solids therein and to facilitate return of the solids to said vessel from said dipleg.

References Cited in the file of this patent

UNITED STATES PATENTS

| | | |
|---|---|---|
| 2,377,657 | Watts | June 5, 1945 |
| 2,378,542 | Edmister | June 19, 1945 |
| 2,464,812 | Johnson | Mar. 22, 1949 |
| 2,472,427 | Johnson | June 7, 1949 |
| 2,529,503 | Kimball | Nov. 14, 1950 |
| 2,710,827 | Gornowski | June 14, 1955 |